INVENTORS.
Robert C. Benton
Roger R. Whitehouse
BY John W. Haines
THEIR ATTORNEY

PROGRAMMED MOTOR VALVES

Filed Sept. 21. 1961 3 Sheets-Sheet 2

INVENTORS.
Robert C. Benton
Roger R. Whitehouse
BY
John W. Gaines
THEIR ATTORNEY INVENTORS.
Robert C. Benton
Roger R. Whitehouse
BY John W. Haines
THEIR ATTORNEY United States Patent Office 3,147,769
Patented Sept. 8, 1964

3,147,769

PROGRAMMED MOTOR VALVES

Robert C. Benton and Roger R. Whitehouse, State College, Pa., assignors to Centre Circuits, Inc., State College, Pa., a corporation of Pennsylvania Filed Sept. 21, 1961, Ser. No. 139,790
4 Claims. (Cl. 137—624.11)

This invention relates to a means of automatically reading the coded perforations punched in a control card, tape, or the like. It more particularly relates to an air-operated, binary code reader and to an intermediate device controlled by, and positioned in response to the reader for transmitting and boosting the air signal output under increased pressure.

In the use of mechanical devices to read perforated tape and cards for the automatic control of machine tools for example, pressure fluid is excellent for physically providing the forces necessary in rapidly and accurately shifting and holding the automatic gages or controls of the machine in their proper position. However, the code-perforated article itself is a comparatively fragile input member and it therefore is the practice to convert the air or vacuum signal from the binary code reader into a different final output signal such as a binary electrical signal; accordingly, low fluid pressures can be used in the reader and there is no particular delay encountered such as would slow down the time between readings if, to the contrary, the pressure fluid were used directly from the reader for actually motivating the tool gages or the like.

As above indicated, the present improvement is a booster device operated by the reader for delivering the final output code as a direct air signal, specifically an air signal under increased pressure; it overcomes the foregoing difficulties by immediately taking and retaining a set position in a way reducing or largely eliminating delay time which might otherwise be expected to ensue between readings. Thereafter, the corresponding reading can be applied from the booster when needed and under the pressure needed whereas the reader can meantime be recycling itself. In other words, this particular improvement for the reader introduces no appreciable delay of the existing reader cycling time and the reader can be going ahead and aligning on a next reading on the tape once it completes each preceding reading.

The instant device preferably takes electrical signals from the pneumatic reader and then reconverts them to the high pressure of an air signal, all without encountering the above difficulties. It overcomes these difficulties and others in a manner as will now be described. Further features, objects, and advantages are either specifically pointed out or will become apparent from the following description taken in conjunction with the accompanying drawings which form a part hereof and in which.

Figure 1:
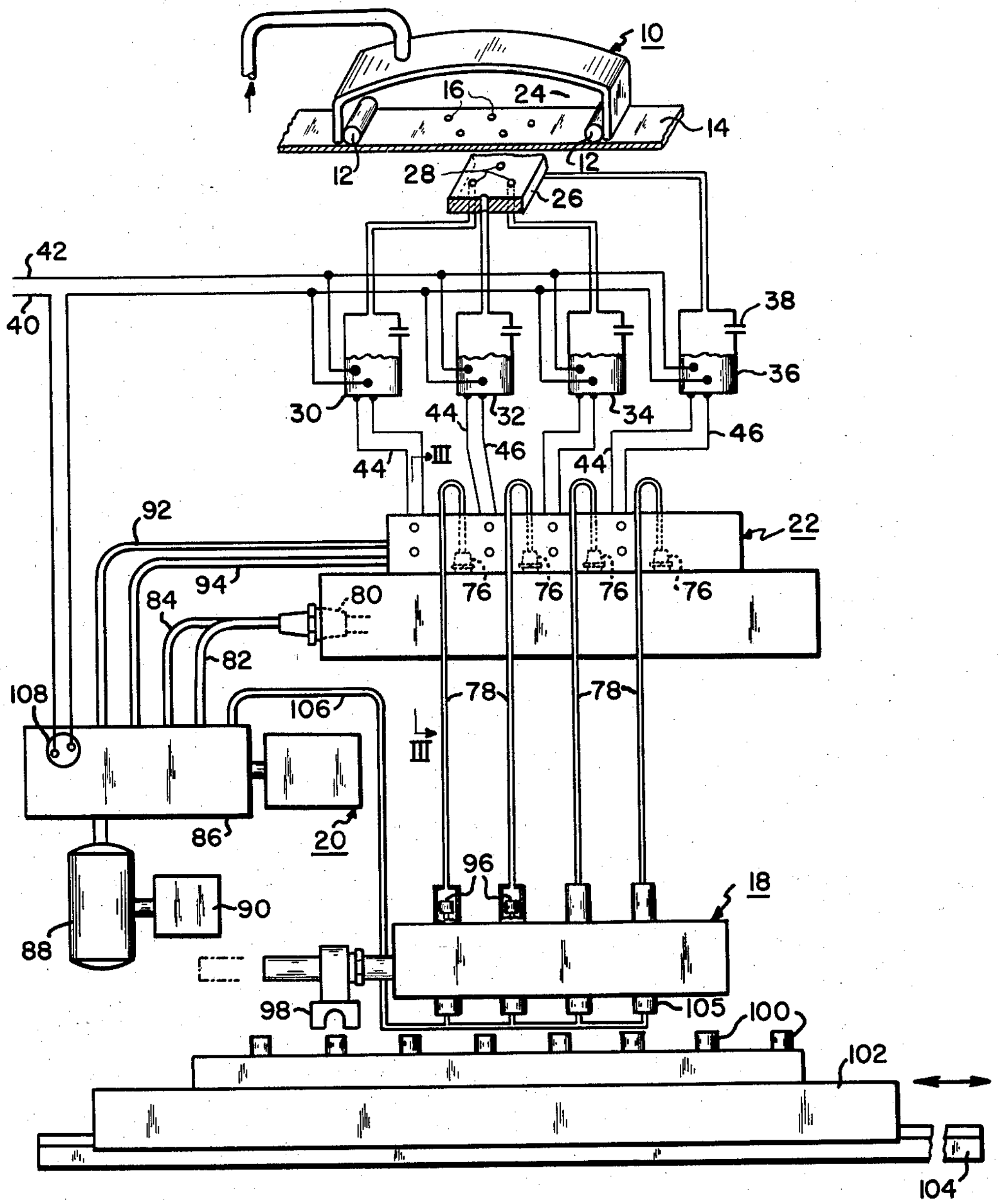
FIGURE 1 is a partially schematic view of a tape-reader-operated, machine tool positioning apparatus including a memory device or booster embodying the present invention.

In FIGURE 1 of the drawings, a tape reader 10 of the apparatus shown includes feed roller structures 12 for feeding a control tape 14 thereto which has been pre-punched with sets of binary perforations 16 for operating a machine tool control 18. This tape 14 is automatically read by the reader to control a programmer 20 for the apparatus but only that portion of the tape and reader is shown which relates per se to the present signal retaining and booster device 22. The reader 10 defines an air tight plenum chamber 24 supplied with air under a few pounds pressure so as to direct streams of air through the sets of perforations 16 following each interrupted advance of the tape 14 for reading.

A reading head 26 comprises a grid block presenting a complete rectangular pattern of openings 28 formed therein; each opening 28 has a connection to a different one of a plurality of pressure switch capsules of which the several capsules 30, 32, 34 and 36 are shown. Thus, as one or more of the perforations 16 register with the corresponding openings 28, the switches of the pressure switch capsules are actuated whereas the unactuated switches have little or no pressure thereon due to a permanently open bleed vent 38 formed in the side of each capsule.

Figure 3:
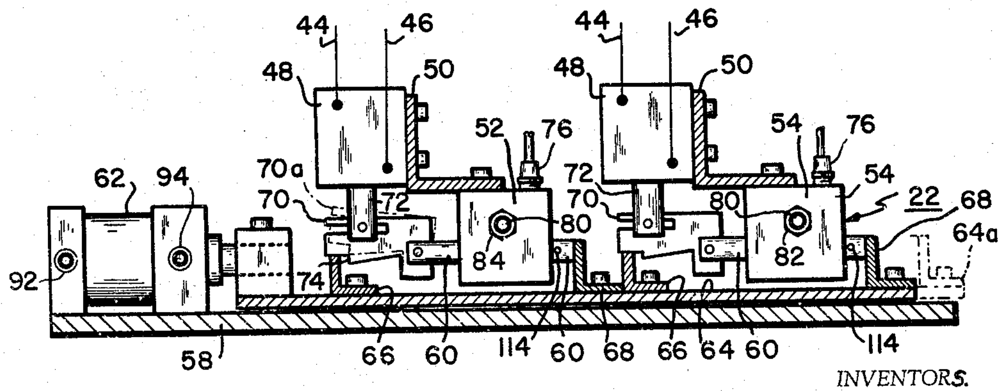
FIGURE 3 is a section taken along the lines III—III of both FIGURES 1 and 2.
Figure 4:
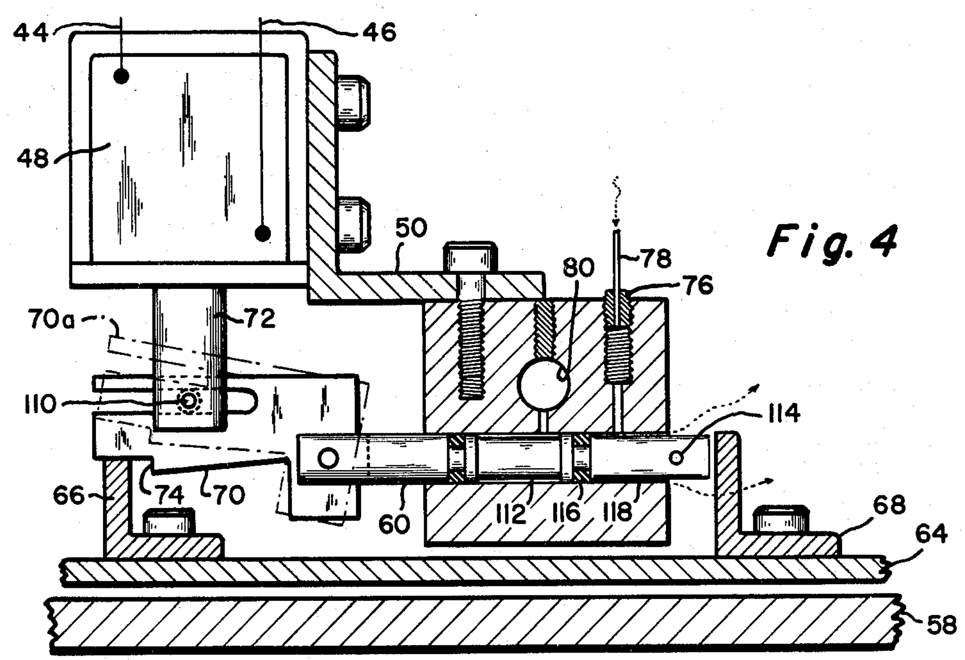
FIGURES 4, 5 and 6 correspond to FIGURE 3 but are to enlarged scale and show a sequence of operating positions.

The switches in the pressure switch capsules are energized from a pair of service wires 40 and 42 and supply electrical output circuits with current which is transmitted through the wires 44 and 46 of the respective circuits. An individual solenoid 48 is connected in each of these circuits as shown in FIGURES 3 and 4. A pair of brackets 50 supports the solenoids 48 in two rows in an offset position relative to two fixed valve blocks 52 and 54. Sets of brackets 56 at opposite ends of the valve block mount the blocks 52 and 54 securely to a base plate 58 of the device 22. As illustrated the block 52 contains six valves 60 slidably mounted therein and the block 54 contains seven of the valves 60.

A double acting piston and cylinder motor 62 is carried by the base 58 and is connected to reciprocate a slide 64 with respect to the base so that the slide moves between the solid line position 64 and the dotted line position **64*a*. A pair of valve setting brackets 66 and a pair of resetting brackets 68 are carried by the slide 64 for operating the valves 60** in unison.

The brackets 66 and 68 are in the line of motion of the double acting piston and cylinder motor 62. The resetting brackets 68 are arranged at a corresponding end of each row of the valves for directly resetting them to their inoperative position. The valves 60 at their opposite end carry a pivoted plate 70 having a pin and slot connection with the upwardly traveling armature 72 of the adjacent solenoid 48.

As a solenoid 48 is energized, it pulls the associated plate 70 into the dotted line inoperative position **70*a*, upon deenergization the armature and plate move by gravity into the solid line position where a notched portion 74 of the plate receives the setting bracket 66 so as to be in the direct path of motion for movement by the associated bracket 66**.

In FIGURE 1, an individual service connection 76 controlled by each valve 60 in the valve block delivers air to an appropriate high pressure line 78. Air is received by the valves from a common manifold 80 in each block which supplies all the valves in that block. Separate connections 82 and 84 between a main valve mechanism 86 and fittings on the blocks 52 and 54 supply high pressure air to the manifolds 80. The main valve 86 is controlled by the programmer 20 and is supplied with air from a regulated source comprising a compressed air tank 88 and a compressor 90 (FIGURE 1). Air under control of the valve 86 operates the double acting motor 62 through a pair of connections 92 and 94.

The high pressure air service lines 78 lead to the positioning cylinders of a machine tool control 18. The cylinders contain actuating plungers 96 and can be employed in a variety of ways depending upon the purpose intended. One example is illustrated in FIGURE 15 of our copending application Serial No. 104,990, filed April 24, 1961.

In said application the positioning cylinders are indicated by the numeral 112 and form part of the gage mechanism 48 of a fractional increment positioner 46 therein illustrated.

As disclosed and claimed more fully in said application, the positioning cylinders which as indicated herein contain the plungers 96, operate to adjust a stopping pawl indicated by the numeral 98 to some fractional inch setting so that when it engages one of a row of passing pins 100 it can cause a work positioning table 102 to stop at the right point.

Briefly, the table 102 is moved on a set of ways 104 by means of a large increment positioning mechanism, not shown. The pins 100 are preferably spaced apart one inch center to center and the stopping pawl 98 is automatically operated to engage the appropriate pin 100 in the indicated way as it moves therepast. Resetting cylinders 105 are subsequently operated by the main valve mechanism 86 through a common connection 106 so as to reset the pawl 98 of the gage mechanism to the zero position following each stopping cycle by the pawl 98.

Figure 2:
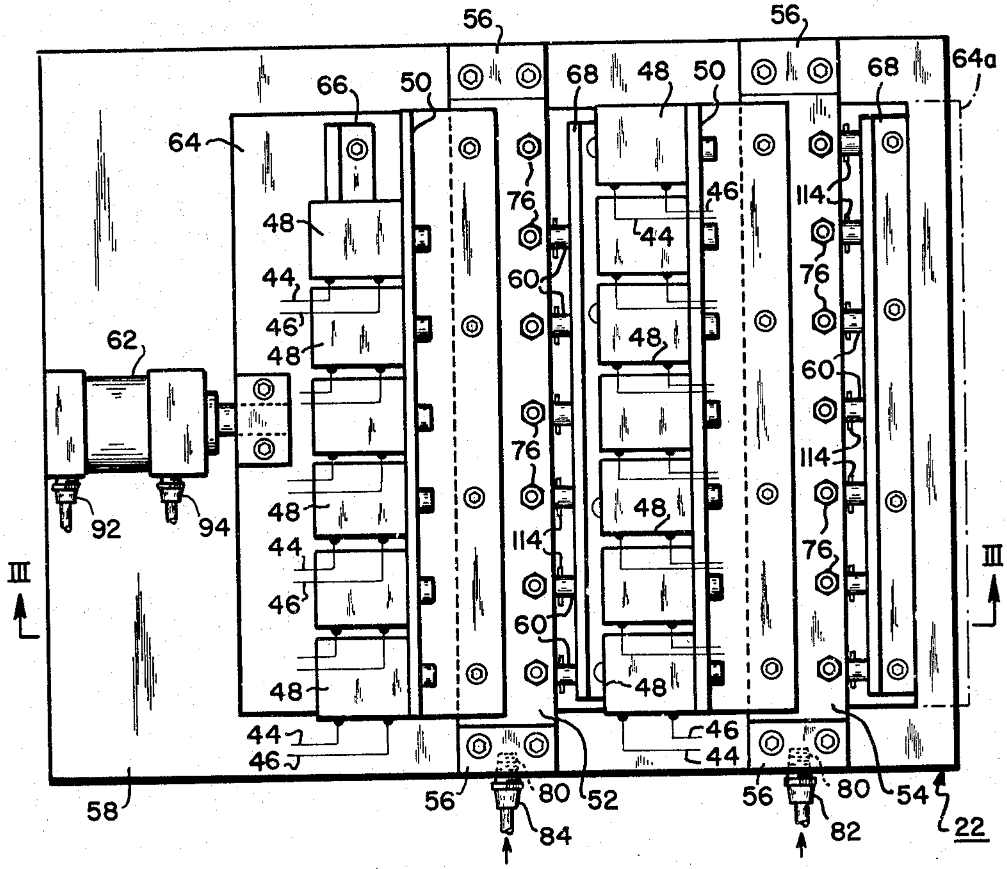
FIGURE 2 is a plan view of the booster of FIGURE 1.

In operation of the apparatus of FIGURES 1, 2 and 3, the rollers 12 feed the control tape 14 to a position over the grid block head 26 for a reading. Streams of air from the plenum chamber 24 enter the openings 28 through registering perforations 16 in the tape so as to operate the proper capsule switches. The programmer 20, which also controls interrupted advance of the rolls 12, has a suitable connection such as by a pressure switch 108 to complete an electrical connection from the service wires 40 and 42 to the switches 30, 32, 34 and 36. Thereupon the appropriate ones of the solenoids 48 are operated in a proper direction to move the pivoted plates 70 into or out of the line of forced motion transmission. The programmer 20 then operates the valve mechanism 86 for applying pressure to both lines 82 and 84 (FIGURE 1) and for applying pressure to the selected line 92 of the lines 92 and 94 for advancingly operating the motor 62 to move the slide into the dotted line position **64*a* (FIGURES 2 and 3). The valves 64 therefore take a stable position to open or close the associated high pressure service lines 78 whereupon without further effect the solenoid 48** can be deenergized by deenergizing the capsule switches.

The valves in the device 22 continue to retain their settings corresponding to the previous electrical signals and thus the air operation of the machine tool control 18 is independently, and preferably, effected while the reader 10 is being recycled with an advance of the tape to read another pattern of the perforations 16 thereon. After the table 102 is stopped, the resetting cylinders 105 are pressurized by the valve mechanism 86 which also pressurizes the line 94 for retractingly moving the double acting motor 62.

The cycle is then repeated.

In FIGURE 4, it will be appreciated that when the solenoid 48 releases, the armature 72 pivots the plate 70 into the solid line position 70. The armature and the plate have a pin and slot connection 110 enabling free movement of the plate and the valve 60 horizontally whenever the setting bracket 66 moves with the slide 64.

Figure 5:
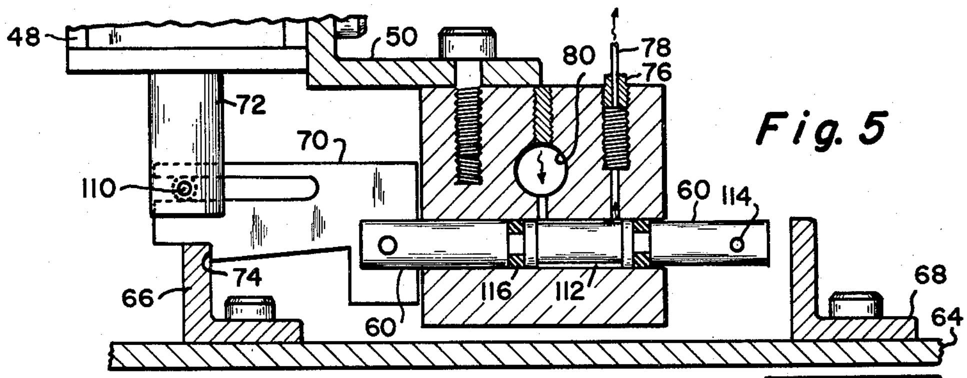

In FIGURE 5, final movement of advance of the valve 60 is shown whereby the supply manifold 80 delivers air through a transfer passage 112 along the valve 60 so as to communicate pressure through the high pressure service line 78 to the machine tool control, not shown.

Opposite movement of the slide 64 beginning from the position taken in FIGURE 5 causes the the resetting plate 68 to engage and restore the valve 60 to its original inoperative position shown in FIGURE 4 wherein a cross pin stop 114 engages the block and stops further movement of the valve 60. In this inoperative position of the valve 60, the transfer passage 112 is blocked by a ring seal 116 from the service line 78 whereas another transfer passage 118 vents the service line 78 through an outlet 118 to atmosphere.

Figure 6:
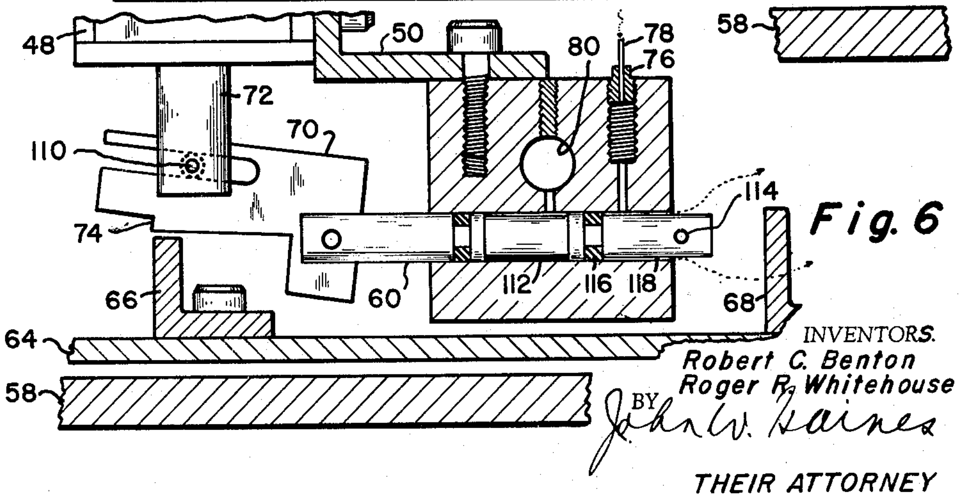

When the solenoid 48 pulls a pivotable plate into the dotted line position **70*a* of FIGURE 4, the slide 64 moves the brackets 66 and 68 independently of the plate 70 into the relative position shown in FIGURE 6. Thus the bracket 66 moves with clearance in a path below the notch 74 and the valve 60 remains in its unactivated position where it continues to vent the service line 78 to atmosphere. Return movement of the slide 64 from the position of FIGURE 6 restores the brackets 66 and 68** to the position shown according to FIGURE 4.

In one physically constructed embodiment of the invention, the operating pressure in the plenum chamber was 20 p.s.i. or less, being preferably about 15 p.s.i. Air pressure applied to the high pressure service lines was approximately 50 p.s.i. The ring seals on the valves 60 were quadring No. 17 rings, made of an elastomeric material resistant to oxidation in air.

It is evident that the pressure switches which control the output circuits 44 and 46 will be of a type whereby they either open their contacts or close their contacts in response to air pressure, depending on the operation desired. In practice, there will generally be certain of these switches with normally open contacts which, in response to a perforation registering therewith, cause the associated high pressure service lines to remain closed. Others of these switches will, though not necessarily so, have normally closed contacts so that, in response to a registering perforation in the tape, they operate in a manner whereby the associated service lines open for passing the high pressure air therethrough.

Variations within the spirit and scope of the invention described are equally comprehended by the foregoing description.

What is claimed is:

1. A signal retaining output device for use in communicating signals from a perforation reader to a signal controlled apparatus, said device comprising a valve with pressure and atmosphere connections, transfer passages, and a service connection for leading a pressure signal to and exhausting pressure from said signal controlled apparatus, a a motor having means of connection to said valve to move same between two positions in which said transfer passages connect said service connection to pressure and to the atmosphere respectively, said means of connection comprising a slide connected to said motor and defining a path of reciprocation adjacent said valve, a setting bracket and a resetting bracket carried by said slide and operatively engageable with said valve from opposite sides, said resetting bracket operative to reset said valve from an operative setting, a pivotable plate aligned in a motion transmitting path between the setting bracket and the valve and pivotable to an in operative position out of the path of motion, and means responsive to signals from said reader for selectively pivoting said plate between inoperative position and an operative position aligned in said motion transmitting path whereby operation of said motor is selectively effective and ineffective to cause said valve to move.

2. The invention of claim 1, said plate having a slot parallel to its motion transmitting path, said last named means comprising air operated switch means and a solenoid disposed transversely to said plate and operated by the switch means, said solenoid having a pin connection to said slot affording continual control of the solenoid over the plate without interfering with the free motion-transmitting movement of the plate.

3. A signal retaining output device for use in communicating signals from a perforation reader to a signal controlled apparatus, said device comprising a valve with pressure and atmosphere connections, transfer passages, and a service connection for leading a pressure signal to and exhausting pressure from said signal controlled apparatus, a motor having means of connection to said valve to move same between positions in which said transfer passages connect said service connection to pressure and to the atmosphere respectively, said means of connection comprising a slide connected to said motor and defining a path of reciprocation adjacent said valve, a setting bracket and a resetting bracket carried by said slide and operatively engageable with said valve from opposite sides, said resetting bracket being operative to reset said valve from an operative setting, a plate aligned in a motion transmitting path between the setting bracket and the valve, said plate being pivotally connected to said valve and pivotable to an inoperative position out of the path of motion, and means responsive to signals from said reader for selectively pivoting said plate between said inoperative position and an opearative position aligned in said motion transmitting path, whereby operation of said motor is selectively effective and ineffective to cause said valve to move.

4. A signal retaining output device for use in communicating signals from a perforation reader to a signal controlled apparatus, said device comprising a valve with pressure and atmosphere connections, transfer passages, and a service connection for leading a pressure signal to and exhausting pressure from said signal controlled apparatus, a motor having means of connection to said valve to move same between two positions in which said transfer passages connect said service connection to pressure and to the atmosphere respectively, said means of connection comprising a slide connected to said motor and defining a path of reciprocation adjacent said valve, a setting bracket carried by said slide and operatively engageable with said valve from one side thereof, resetting means carried by the slide and operatively engageable with the valve from the opposite side, a pivotable plate including a shoulder aligned in a motion transmitting path between the setting bracket and the valve and pivotable to an inoperative position in which the shoulder is out of the path of motion, and means responsive to signals from said reader for selectively pivoting said plate between the inoperative position and an operative position aligned in said motion transmitting path, whereby operation of said motor is selectively effective and ineffective to cause said valve to move.

References Cited in the file of this patent

UNITED STATES PATENTS

| | | |
|---|---|---|
| 2,524,029 | Carroll | Oct. 3, 1950 |
| 2,565,689 | Howse | Aug. 28, 1951 |
| 2,620,632 | Rose | Dec. 9, 1952 |
| 2,630,832 | Lutherer | Mar. 10, 1953 |
| 2,805,552 | Hudson | Sept. 10, 1957 |
| 2,824,182 | Lambert | Feb. 18, 1958 |
| 2,860,751 | Seigle | Nov. 18, 1958 |